(12) United States Patent
Lai et al.

(10) Patent No.: US 9,639,577 B1
(45) Date of Patent: May 2, 2017

(54) SYSTEMS AND METHODS FOR DETERMINING MEMBERSHIP OF AN ELEMENT WITHIN A SET USING A MINIMUM OF RESOURCES

(71) Applicant: Symantec Corporation, Mountain View, CA (US)

(72) Inventors: Everett Lai, Monterey Park, CA (US); Kenneth Coleman, Knoxville, TN (US); Qun Li, Chino Hills, CA (US); Yuval Tarsi, Lafayette, CA (US)

(73) Assignee: Symantec Corporation, Mountain View, CA (US)

( * ) Notice: Subject to any disclaimer, the term of this patent is extended or adjusted under 35 U.S.C. 154(b) by 349 days.

(21) Appl. No.: 13/851,751

(22) Filed: Mar. 27, 2013

(51) Int. Cl.
*G06F 17/30* (2006.01)

(52) U.S. Cl.
CPC .. *G06F 17/30477* (2013.01); *G06F 17/30699* (2013.01)

(58) Field of Classification Search
CPC .................................................. G06F 17/30699
See application file for complete search history.

(56) References Cited

U.S. PATENT DOCUMENTS

| 8,290,972 | B1 * | 10/2012 | Deshmukh et al. | 707/758 |
| 8,396,873 | B2 * | 3/2013 | Xie | G06F 17/30631 707/673 |
| 8,484,438 | B2 * | 7/2013 | Cypher | 711/216 |
| 9,058,298 | B2 * | 6/2015 | Anglin | G06F 11/1453 |
| 2006/0112112 | A1 * | 5/2006 | Margolus et al. | 707/100 |
| 2009/0132474 | A1 * | 5/2009 | Ma | G06F 17/30451 |
| 2011/0202725 | A1 * | 8/2011 | Rose et al. | 711/118 |
| 2011/0225191 | A1 * | 9/2011 | Xie | G06F 17/30631 707/775 |
| 2012/0185447 | A1 * | 7/2012 | Zhang | G06F 17/30156 707/693 |
| 2014/0195720 | A1 * | 7/2014 | Akella et al. | 711/103 |

OTHER PUBLICATIONS

Krimer et al., The Power of 1 + a for Memory Efficient Bloom Filters, Internet Mathematics, vol. 7, No. 1, 2011.
Wikipedia, Bloom filter, available from http://en.wikipedia.org/wiki/Bloom_filter, as early as Oct. 2013.

(Continued)

*Primary Examiner* — Robert Beausoliel, Jr.
*Assistant Examiner* — Arthur Ganger
(74) *Attorney, Agent, or Firm* — Holland & Hart LLP

(57) ABSTRACT

A computer-implemented method for scanning a file is described. A Golomb-Compressed Sequence (GCS) index may be queried to determine whether GCS data is associated with the scanned data. The GCS index may be stored in a first storage medium and the GCS data may be stored in a second storage medium. The second storage medium may be different from the first storage medium. Upon determining the GCS data is associated with the scanned data, the location of the GCS data associated with the scanned data may be identified. The GCS data may be retrieved from the identified location. At least a portion of the retrieved GCS data may be analyzed. Based on the analysis of the retrieved GCS data, it may be determined whether to perform additional data querying.

9 Claims, 12 Drawing Sheets

(56) References Cited

OTHER PUBLICATIONS

Li, Memory Efficient Parallel Bloom Filters for String Matching, IEEE, Apr. 2009. (Abstract Only).
Putze et al., Cache-, Hash- and Space-Efficient Bloom Filters, Karlsruhe Institute of Technology, Jun. 2007.
Hypertable, Bloom Filters, obtained from http://code.google.com/p/hypertable/wiki/BloomFilters, available as early as Feb. 4, 2010.
Mustafa et al., Buffered Bloom Filters on Solid State Storage, 1st International Workshop on Accelerating Data Management Systems Using Modern Processor and Storage Architectures (ADMS), 2010.

* cited by examiner

SYSTEMS AND METHODS FOR DETERMINING MEMBERSHIP OF AN ELEMENT WITHIN A SET USING A MINIMUM OF RESOURCES

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

In the Computer Science space, many problems include a database to perform lookups on computer systems. In some cases, the database may exceed the amount of memory available in the computer system. Look-ups into the database may be frequent since file scans occur on a continuous basis at the same time that disk and CPU resources may be maxed out. Currently, a Bloom filter may be used to filter the file hashes in order to avoid computationally expensive on-disk lookups. However, a Bloom filter may also exceed the amount of memory available in the computing system. Also, storing a Bloom filter on disk may be undesirable because the Bloom filter may require an increased number of lookups to determine whether a single element is a member of the Bloom filter, placing a relatively heavy burden on rotational disk drives. A system to determine membership of an element within a set while using a minimum of system memory, disk drive space, CPU resources, and disk drive input/output (I/O) would be desirable.

SUMMARY

According to at least one embodiment, a computer-implemented method for scanning data is described. A Golomb-Compressed Sequence (GCS) index may be queried to determine whether GCS data is associated with the scanned data. The GCS index may be stored in a first storage medium and the GCS data may be stored in a second storage medium. The second storage medium may be different from the first storage medium. Upon determining the GCS data is associated with the scanned data, the location of the GCS data associated with the scanned data may be identified. The GCS data from the identified location may be retrieved. At least a portion of the retrieved GCS data may be analyzed. Based on the analysis of the retrieved GCS data, it may be determined whether to perform additional data querying.

In one example, upon determining the GCS data is not associated with the scanned data, a determination may be made whether to perform additional data querying based on the query of the GCS index. In one embodiment, the GCS index may include an index of a GCS data structure. The first storage medium of the GCS index may include a random-access memory. In some embodiments, the GCS data structure may include the GCS data. The second storage medium of the GCS data structure may include a hard disk drive.

In some configurations, a GCS pre-filter index may be queried to determine whether GCS pre-filter data is associated with the scanned data. The GCS pre-filter index may be stored in a random-access memory. Upon determining the GCS pre-filter data is associated with the scanned data, in some embodiments, the location of the GCS pre-filter data associated with the scanned data may be identified. In one embodiment, the GCS pre-filter data may be retrieved from the identified location of GCS pre-filter data and at least a portion of the retrieved GCS pre-filter data may be analyzed. The GCS pre-filter data may be stored in the random-access memory. In one configuration, based on the analysis of the retrieved GCS pre-filter data, a determination may be made whether to query the GCS index.

In some embodiments, a plurality of hashes may be sorted in relation to the scanning of the data. Duplicates among the plurality of hashes may be deduplicated in one embodiment. In one configuration, the GCS index may be queried in relation to the plurality of sorted and deduplicated hashes to determine whether one or more of the plurality of sorted and deduplicated hashes is associated with the GCS data. In one embodiment, a location of GCS data may be identified for each of the plurality of sorted and deduplicated hashes that is associated with the scanned data. In some embodiments, a list of file offsets may be generated that enable a single hard disk drive read request based on the identified plurality of locations of GCS data. The GCS data may be retrieved from the identified plurality of locations and at least a portion of the retrieved GCS data may be analyzed. A determination may be made, based on the analysis of the GCS data associated with the plurality of sorted and deduplicated hashes, whether to perform additional data querying.

A computing device configured to scan a data is also described. The device may include a processor and memory in electronic communication with the processor. The memory may store instructions that are executable by the processor to query a Golomb-Compressed Sequence (GCS) index to determine whether GCS data is associated with the scanned data. The GCS index may be stored in a first storage medium and the GCS data may be stored in a second storage medium. In some embodiments, the second storage medium may be different from the first storage medium. The memory may store instructions that are executable by the processor to identify, upon determining the GCS data is associated with the scanned data, the location of the GCS data associated with the scanned data. The memory may store instructions that are executable by the processor to retrieve the GCS data from the identified location, analyze at least a portion of the retrieved GCS data, and determine, based on the analysis of the retrieved GCS data, whether to perform additional data querying.

A computer-program product to scan a file is also described. The computer-program product may include a non-transitory computer-readable medium that stores instructions. The instructions may be executable by a processor to query a Golomb-Compressed Sequence (GCS) index to determine whether GCS data is associated with the scanned data. The GCS index may be stored in a first storage medium and the GCS data may be stored in a second storage medium. In some embodiments, the second storage medium may be different from the first storage medium. The instructions may be executable by a processor to identify, upon determining the GCS data is associated with the scanned data, the location of the GCS data associated with the scanned data. The instructions may be executable by a processor to retrieve the GCS data from the identified location, analyze at least a portion of the retrieved GCS data, and determine, based on the analysis of the retrieved GCS data, whether to perform additional data querying.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
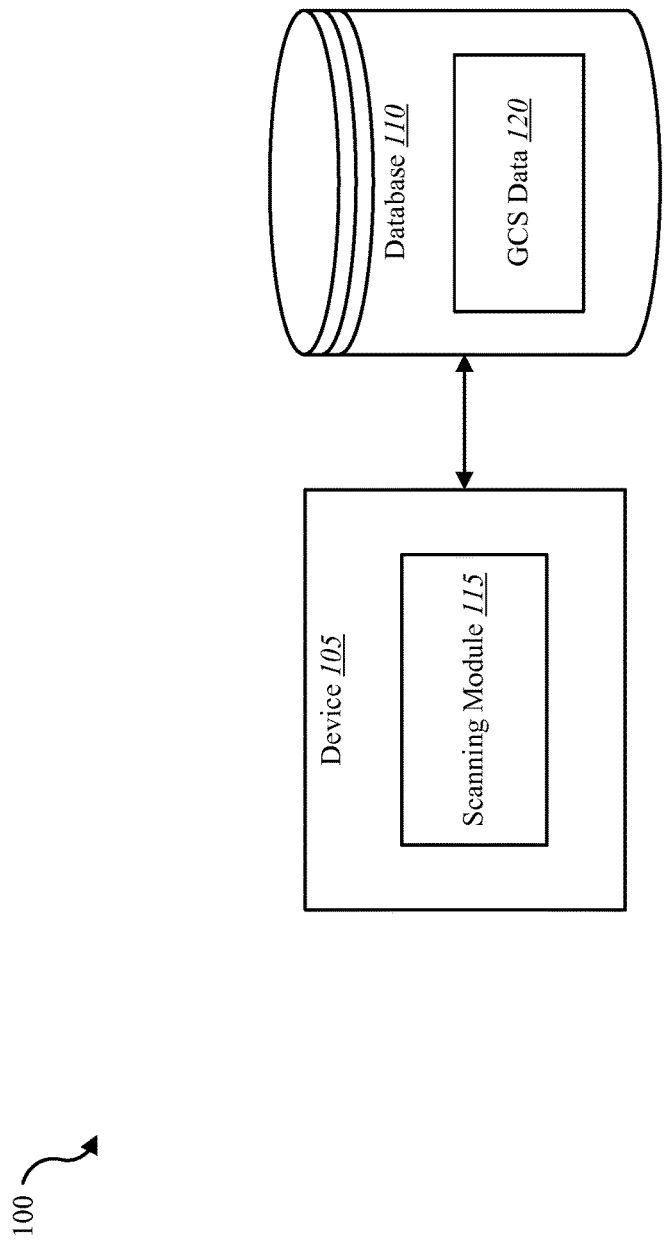
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to scanning data. More specifically, the systems and methods described herein relate to scanning data in order to determine membership of an element of the data within a set while using a minimum of system memory, disk space, CPU resources, and disk input/output (I/O).

A set may be an abstract data structure that can store certain values, without any particular order, and no repeated values. An element, or member, of a set is any one of the distinct objects that make up that set, including the set itself in some cases. A Bloom filter may be used to test whether an element is a member of a set. False positive retrieval results are possible with Bloom filters, but false negatives are not (i.e., a query returns either "element is within the set" (may be a false positive) or "element is definitely not within the set."

A hash function is any algorithm or subroutine that maps large data sets of variable length to smaller data sets of a fixed length. For example, a person's name, having a variable length, could be hashed to a single integer. The values returned by a hash function are called hash values, hash codes, hash sums, checksums or simply hashes. In computing fields, there may be a large database that cannot be kept in memory in some environments. A Bloom filter may be used to avoid high-latency on-disk lookups, but since Bloom filters may also become too large to keep in memory and because Bloom filters ideally may take multiple lookups to determine if a single item is within the set, current Bloom filters may place a large burden on rotational disk drives.

Similarly, in a database may maintain a hash of multiple points of data and may use this set to detect specific combinations of data. Lookups may be performed using a large in-memory hash table, however, such hash tables may not scale well. Moving a hash table to disk due to its size may free up memory, but may also result in unacceptable performance issues due to the high-latency performance of rotational disks.

Implementing a Golomb-compressed sequence (GCS) filter may free up memory and minimize disk lookups, resulting in improved system performance and reliability. A GCS filter may be a type of compressed Bloom filter based on Golomb coding. Golomb coding is a lossless data compression method using a family of data compression codes and an optimal encoding method for geometrically distributed values. A GCS filter mirrors the structure of a compressed Bloom filter, in that the elements are hashed into a space of size "n/p," n being the number of inserted elements and p being the false positive probability. However, while a compressed Bloom filter treats the space as a bitmap, a GCS filter treats the space as a list of values. Since the values are the result of hashing, the values may be uniformly distributed in order to sort them and build a list of differences. The differences may be geometrically distributed with a parameter of "p."

Currently, a Bloom filter may calculate and check multiple hash values for each scan of a single-element lookup. A Bloom filter may be replaced by a GCS data structure configuration described herein that uses a single hash value to be looked up for each scan. In one embodiment, a GCS data structure may be separated from an index (GCS index) to the GCS data structure. While the GCS data structure may be stored on a disk (e.g., a hard disk drive), the GCS index may be stored in system memory (e.g., random-access memory), resulting in less system memory utilization and less high-latency disk read requests (i.e., one read request per look up versus multiple for a standard Bloom filter), thus improving system performance.

FIG. 1 is a block diagram illustrating one embodiment of an environment 100 in which the present systems and methods may be implemented. In some embodiments, the systems and methods described herein may be performed on a single device (e.g., device 105). For example, a scanning module 115 may be located on the device 105. Examples of devices 105 include mobile devices, smart phones, personal computing devices, computers, servers, etc.

In some configurations, a device 105 may include a scanning module 115. In one example, the device 105 may be coupled to a database 110. In one embodiment, the database 110 may be internal to the device 105. In another embodiment, the database 110 may be external to the device 105. In some configurations, the database 110 may include GCS data 120.

In one embodiment, the scanning module 115 may scan data, a file, and/or data related to a file. The scanning module 115 may scan a file to determine whether an element of the file (e.g., data associated with the file, the file itself, etc.) is included within a set. In some embodiments, the scanning module 115 may implement a GCS filter to determine whether the element is a member of the set. In one configuration, the scanning module 115 may query the GCS data 120 stored in the database 110 in relation to the operation to determine whether the element is a member of the set. In some embodiments, the scanning module 115 may query an index of the GCS data 120 to determine whether the element is a member of the set.

Figure 2:
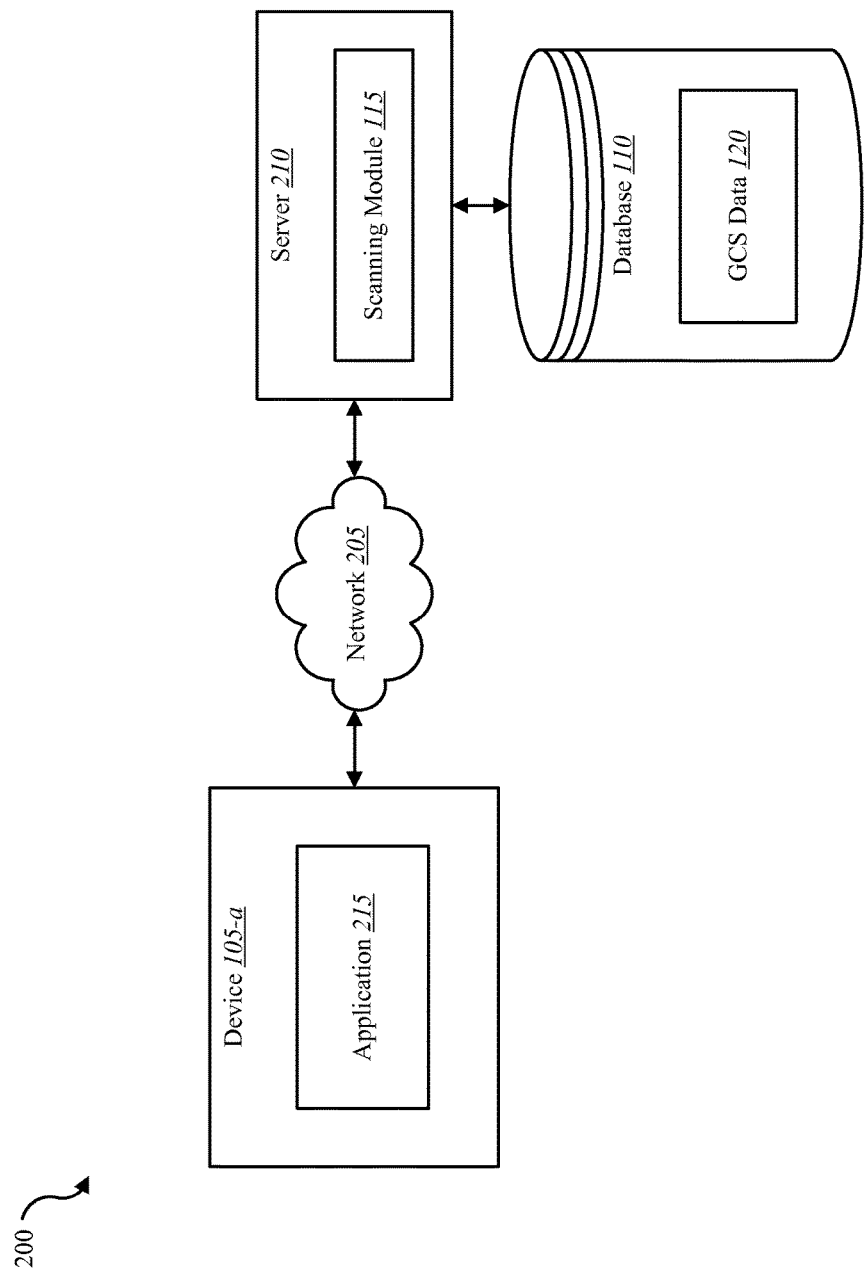
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 105-a may communicate with a server 210 via a network 205. Example of networks 205 include, local area networks (LAN), wide area networks (WAN), virtual private networks (VPN), wireless networks (using 802.11, for example), cellular networks (using 3G and/or LTE, for example), etc. In some configurations, the network 205 may include the internet. In some configurations, the device 105-a may be one example of the device 105 illustrated in FIG. 1. It is noted that in some embodiments, the device 105-a may not include a scanning module 115. For example, the device 105-a may include an application 215 that allows the device 105-a to interface with the scanning module 115 located on server 210. In some embodiments, both the device 105-a and the server 210 may include a scanning module 115 where at least a portion of the functions of the scanning module 115 are performed separately and/or concurrently on both the device 105-a and the server 210.

In some embodiments, the server 210 may include the scanning module 115 and may be coupled to the database 110. For example, the scanning module 115 may access the GCS data 120 in the database 110 via the server 210. The database 110 may be internal or external to the server 210.

In some configurations, the application 215 may enable the device 105-a to interface with the scanning module 115 to scan data, a file, and/or data related to a file. Thus, the application 215, via the scanning module 115, may scan a file to determine whether an element of the file (e.g., data associated with the file, the file itself, etc.) is included within a set.

Figure 3:
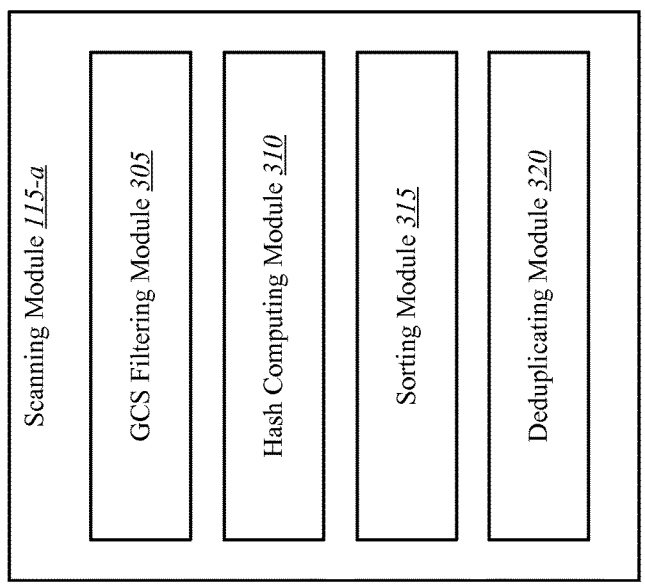
FIG. 3 is a block diagram illustrating one example of a scanning module.

FIG. 3 is a block diagram illustrating one example of a scanning module 115-a. The scanning module 115-a may be one example of the scanning module 115 depicted in FIGS. 1 and/or 2. As depicted, the scanning module 115-a may include a GCS filtering module 305, a hash computing module 310, a sorting module 315, and a deduplicating module 320.

In some configurations, the GCS filtering module 305 may perform a query in relation to the scanning module 115-a scanning a file and/or data. In one embodiment, GCS filtering module 305 may query a GCS index to determine whether GCS data is associated with the scanned data. In one embodiment, upon determining the GCS data is associated with the scanned data, the GCS filtering module 305 may identify the location of the GCS data associated with the scanned data, retrieve the GCS data from the identified location, and analyze at least a portion of the retrieved GCS data to determine whether to perform additional data querying.

In one embodiment, the hash computing module 310 may compute a hash based on the scanning module 115-a scanning a selected file and/or data. In some embodiments, the hash computing module 310 may compute two or more hashes associated with the data and/or one or more files being scanned. In one example, the sorting module 315 may sort multiple hashes calculated by the hash computing module 310 in relation to the scanning of the data. In one embodiment, the deduplicating module 310 may detect duplicates among the multiple hashes computed by the computing module 310. Upon determining that duplicates exist, the deduplicating module 320 may deduplicate the detected duplicate hashes among the multiple hashes computed by the hash computing module 310. In some configurations, the sorted and de-duped list of hashes may be looked up against a GCS index. In one example, a list of file offsets may be generated to create a single disk read request for the data query. Once the on-disk data is retrieved, each block may be examined to determine if any hash requires further examination. In some embodiments, an in-memory pre-filter may be utilized to reduce the chances of performing a disk read and/or reduce the number of disk blocks that need to be retrieved.

Figure 4:
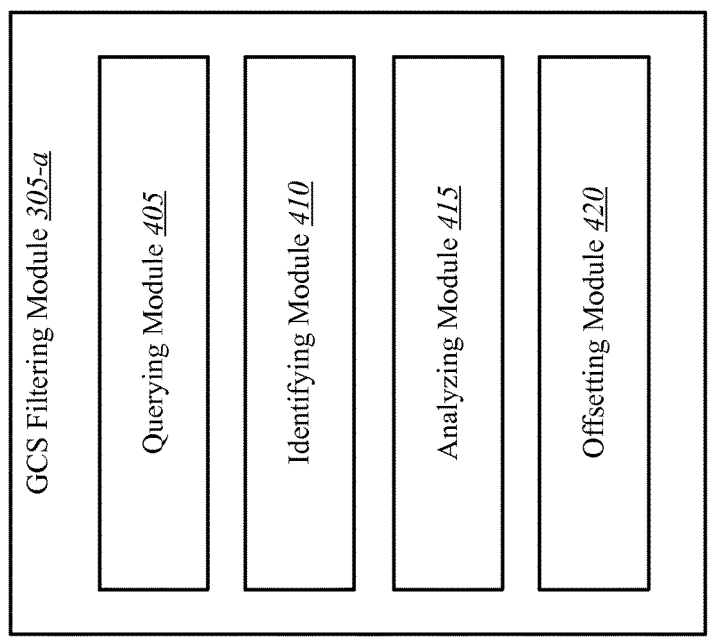
FIG. 4 is a block diagram illustrating one example of a GCS filtering module.

FIG. 4 is a block diagram illustrating one example of a GCS filtering module 305-a. The GCS filtering module 305-a may be one example of the GCS filtering module 305 illustrated in FIG. 3. As depicted, the GCS filtering module 305-a may include a querying module 405, an identifying module 410, an analyzing module 415, and an offsetting module 420.

In one example, querying module 405 may perform a query in relation to the scanning module 115 performing a scan of a file, data, and/or data associated with one or more files. In one embodiment, querying module 405 may perform a query of an index of GCS data. For example, querying module 405 may query a GCS index to determine whether GCS data is associated with the scanned data. A query of the GCS index may return either a hit indicating that at least a portion of the scanned data is a member of the set contained within the GCS data, or a miss indicating that no portion of the scanned data is a member of the set contained within the GCS data. In some embodiments, the query may indicate a possibility (i.e., false positives are a possibility with GCS filters) that the GCS data contains a match with at least a portion of the scanned data, or may indicate a certainty that the GCS data does not contain a match with at least a portion of the scanned data. As explained below, when the query indicates that the GCS data may contain a match with the scanned data, the GCS filtering module 305-a may further analyze the GCS data to determine whether further querying is necessary. In some embodiments, the GCS filtering module 305-a may verify whether the possibility of a match indicated by the querying module's 405 query of the GCS index indicates an actual match.

Upon determining that no match exists, the GCS filtering module 305-a may determine whether to perform further data querying, e.g., performing a scan of data stored on a hard disk drive. In some embodiments, upon determining that the GCS data possibly contains a match with at least a portion of the scanned data, the GCS filtering module 305-*a* may send a quick reply (i.e., a response based solely on a query of the GCS index, with no further data querying performed for the data being scanned) to the scanning module 115 indicating that no match between the GCS data and the scanned data was identified.

In certain embodiments, the GCS index may be stored in a first storage medium and the GCS data may be stored in a second storage medium. The second storage medium may be different from the first storage medium. In one embodiment, the first storage medium may be a random-access memory, and the second storage medium may be a hard disk drive. In one configuration, the GCS index includes an index of a GCS data structure, the GCS data structure containing the GCS data.

In some embodiments, upon determining the GCS data is associated with the scanned data, identifying module 410 may identify the location of the GCS data associated with the scanned data. Upon identifying the location of the GCS data, in some embodiments, analyzing module 415 may retrieve the GCS data from the identified location. In one embodiment, analyzing module 415 may analyze at least a portion of the retrieved GCS data. Based on the analysis of the retrieved GCS data, in some embodiments, analyzing module 415 may determine whether to perform additional data querying. For example, analyzing module 415 may determine whether the indicated possibility of a match between the scanned data and the GCS data indicates an actual match. Upon determining an actual match, the GCS filtering module 305-*a* may send a response of the actual match to the scanning module 115 without performing further data querying for the data being scanned. In some embodiments, upon determining the GCS data is not associated with the scanned data, the analyzing module 415 may determine whether to perform additional data querying.

In some embodiments, querying module 405 may perform a pre-filter query in relation to the scanning module 115 performing a scan of a file, data, and/or data associated with one or more files. For example, querying module 405 may query a GCS pre-filter index to determine whether GCS pre-filter data is associated with the scanned data. In one configuration, the GCS pre-filter index may be stored in a random-access memory. In some embodiments, the GCS pre-filter index may be stored in the same random-access memory in which the GCS index is stored. Upon determining the GCS pre-filter data is associated with the scanned data, in one embodiment, the identifying module 410 may identify the location of the GCS pre-filter data associated with the scanned data. Upon identifying the location of the GCS pre-filter data, the analyzing module 415 may retrieve the GCS pre-filter data from the identified location of GCS pre-filter data. In some embodiments, the GCS pre-filter data may be stored in a random-access memory. In some embodiments, the GCS pre-filter data may be stored in the same random-access memory in which the GCS pre-filter index is stored. Upon retrieving the GCS pre-filter data, analyzing module 415 may analyze at least a portion of the retrieved GCS pre-filter data in order to determine, based on the analysis of the retrieved GCS pre-filter data, whether to query the GCS index.

As with the GCS index, when the query of the GCS pre-filter index indicates that the GCS data may contain a match with the scanned data, the GCS filtering module 305-*a* may further analyze the GCS pre-filter data to determine whether further querying is necessary. Additionally, or alternatively, upon determining that the GCS pre-filter data possibly contains a match with at least a portion of the scanned data, the GCS filtering module 305-*a* may send a quick reply (i.e., a response based solely on a query of the GCS pre-filter index, with no further data querying performed for at least that portion of the data being scanned) to the scanning module 115 indicating that a match between the GCS pre-filter data and the scanned data was identified. In some embodiments, the GCS filtering module 305-*a* may verify whether the possibility of a match indicated by the querying module's 405 query of the GCS pre-filter index indicate an actual match. Upon determining that no match exists, the GCS filtering module 305-*a* may determine whether to perform further data querying, i.e., querying the GCS index and/or performing a scan of data stored on a hard disk drive.

As described above, hash computing module 310 may compute one or more hashes based on the data and/or file being scanned. Upon hash computing module 310 computing two or more hashes, sorting module 315 may sort the multiple hashes in relation to the scanning of the data, and deduplicating module 320 may deduplicate any detected duplicates among the multiple hashes. In one embodiment, querying module 405 may query a GCS index in relation to the plurality of sorted and deduplicated hashes in order to determine whether one or more of the plurality of sorted and deduplicated hashes is associated with GCS data. In one example, the identifying module 410 may identify a location of GCS data for each of the plurality of sorted and deduplicated hashes that is determined to be possibly associated with GCS data. In some embodiments, the offsetting module 420 may generate a list of file offsets in relation to q query of on-disk GCS data. The file offsets may be configured to enable a single hard disk drive read request based on the identified plurality of locations of GCS data. A file's data may be arranged on the disk in an order similar to the way it is arranged in the file. The file offset may be an offset from the beginning of the file. The file offset may enable a read operation to read the requested data from a beginning point of the data to an endpoint in a contiguous manner in order to avoid the magnetic head sweeping back and forth to each data location.

In some embodiments, the file offset allows on-disk lookups that require at most a single disk seek and read to determine membership of a targeted element within a set (e.g., GCS data). In some embodiments, membership of multiple values may be looked up against the GCS index (e.g., multiple hashes). Thus, a list of file offsets may be generated to create a single disk read request (i.e., a single sweep of a magnetic head over a disk platter of the hard disk drive) for all the data of the multiple values analyzed by the lookup. In some embodiments, the in-memory GCS index may be checked to find the location of the actual GCS data on disk. Once the on-disk data is retrieved, the data may be examined to determine if the file requires further examination such as a high-latency on-disk query.

In one embodiment, the analyzing module 415 may retrieve the GCS data from the identified plurality of locations in order to analyze at least a portion of the retrieved GCS data. Based on the analysis of the GCS data determined to be associated with the plurality of sorted and deduplicated hashes, the analyzing module 415 may determine whether to perform additional data querying. For example, in some cases, the hash computing module may compute ten deduplicated and sorted hashes related to a particular portion of data being scanned. The querying module 405 may query the GCS pre-filter data to determine that the GCS pre-filter data contains a match for three of the ten hashes, leaving a remainder of seven hashes without a match in the GCS pre-filter data.

In one embodiment, analyzing module 415 may analyze GCS pre-filter data for the three GCS-pre-filter-data matched hashes. For example, analyzing module 415 may determine that one or more of the three GCS-pre-filter-data-matched hashes are false positives. In this case, GCS filtering module 305-a may perform further querying on those GCS-data-matched hashes determined to be false positives. In one example, analyzing module 415 may determine all three of the matched hashes are actual matches. Based on the analysis of the analyzing module 415, GCS filtering module 305-a may determine to perform further data querying for any of the three matched hashes determined to be actual matches, in addition to the seven unmatched hashes.

Figure 5:
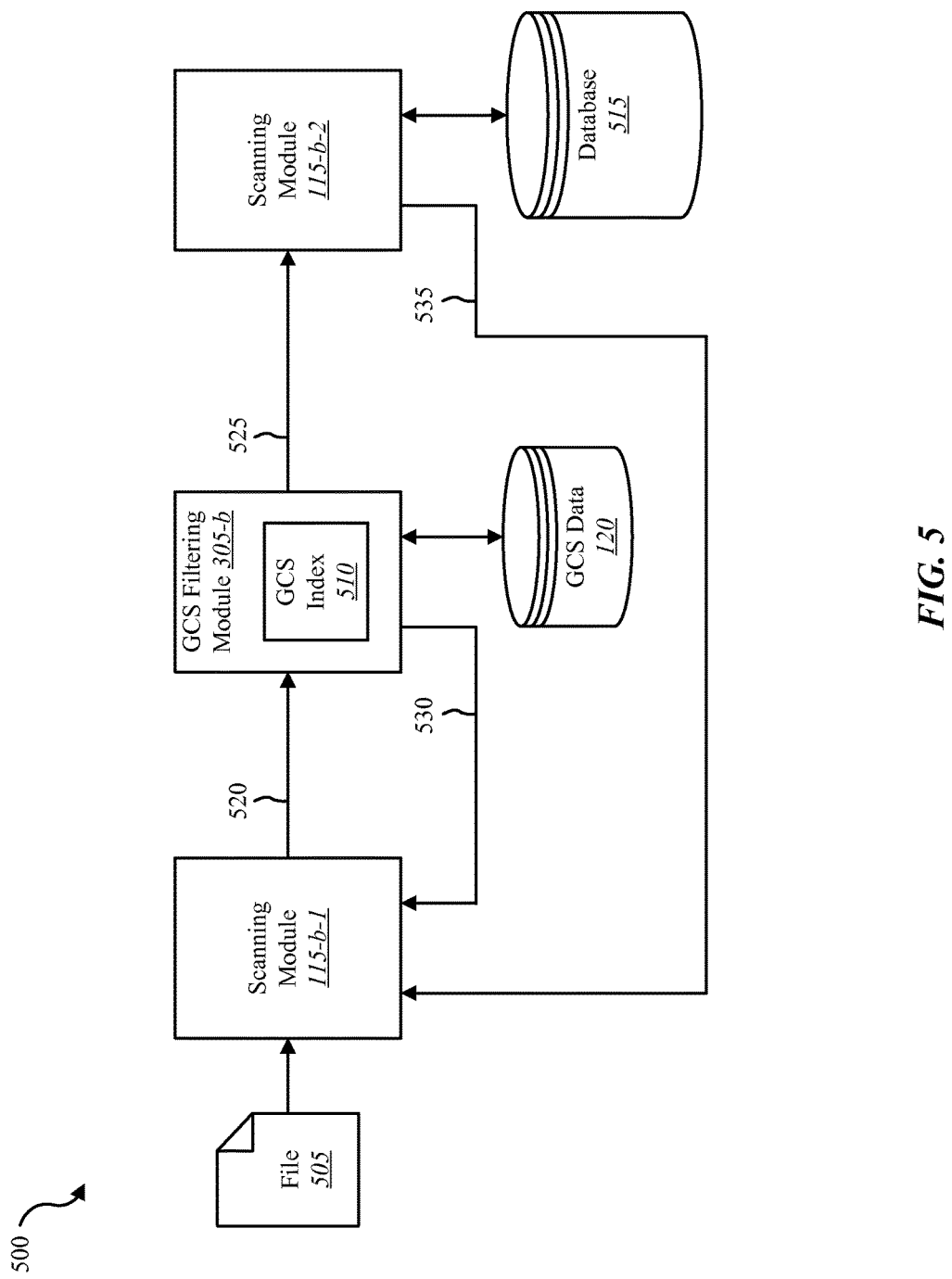
FIG. 5 is a block diagram illustrating another embodiment of an environment in which the present systems and methods may be implemented.

FIG. 5 is a block diagram illustrating another embodiment of an environment 500 in which the present systems and methods may be implemented. The depicted environment 500 may be one example of a server 210 depicted in FIG. 2. Alternatively, the environment 500 may be one example of a device 105 depicted in FIGS. 1, and/or 2.

The environment 500 as depicted may include a file 505, scanning modules 115-b-1 and 115-b-2, a GCS filtering module 305-b, GCS data 120, and database 515. In some embodiments, GCS data 120 may include a GCS data structure. The scanning modules 115-b-1 and 115-b-2 may be examples of scanning module 115 depicted in FIGS. 1, 2, and/or 3. Although depicted as separate blocks, in some configurations, scanning module 115-b-1 and 115-b-2 may be two parts of the same scanning module. The GCS filtering module 305-b may be one example of the GCS filtering module 305 depicted in FIGS. 3 and/or 4. The GCS filtering module 305-b may include a GCS index 510.

In one embodiment, scanning module 115-b-1 may select a file to scan (e.g., file 505). Additionally, or alternatively, scanning module 115-b-1 may select a portion of data to scan. In some embodiments, scanning module 115-b-1 may compute a hash for the data being scanned, and at 520 may send the hash to the GCS filtering module 305-b. In some embodiments, scanning module 115-b-1 may send the data directly to GCS filtering module 305-b. For example, scanning module 115-b-1 may send file 505 to the GCS filtering module 305-b. In some embodiments, GCS filtering module 305-b may query the GCS index 510 in relation to the data GCS filtering module 305-b receives from scanning module 115-b-1 at 520. In one example, without performing any further query regarding the data received at 520, GCS filtering module 305-b may send at 530 a quick reply (i.e., a response based solely on a query of a GCS index, with no further data querying performed for the data being scanned) to the scanning module 115-b-1 based solely on the query of the GCS index 510. In some embodiments, GCS filtering module 305-b may determine whether GCS data 120 possibly contains a match for the data received at 520. Upon determining GCS data 120 likely contains the match, GCS filtering module 305-b may send a quick reply to the scanning module 115-b-1 at 530. In some embodiments, GCS filtering module 305-b may identify a location of the data within GCS data 120 that is indicated to match the data received at 520. GCS filtering module 305-b, in one embodiment, may retrieve the data at the indicated location in a single disk read request (e.g., single sweep of the magnetic head in a hard disk drive). GCS filtering module 305-b may analyze the retrieved data to determine whether to perform further data querying. Based on the analysis of the retrieved data, GCS filtering module 305-b may send at 530 a quick reply to the scanning module 115-b-1 based on the analysis of the data of GCS data 120.

In some embodiments, upon determining to perform further data querying, at 525 GCS filtering module 305-b may send at least a portion of the data received at 520 to scanning module 115-b-2. In some embodiments, upon determining GCS data 120 does not contain a match for the data received at 520, GCS filtering module 305-b may send data to scanning module 115-b-2. In one embodiment, scanning module 115-b-2 may query database 515 to determine whether data in database 515 matches the data received at 525. Upon determining a match exists between the data received at 525 and data in the database 515, at 535 scanning module 115-b-2 may send a reply to the scanning module 115-b-1 indicating the match. Upon determining no match exists between the data received at 525 and data in the database 515, at 535 scanning module 115-b-2 may send a reply to the scanning module 115-b-1 indicating no match exists.

Figure 6:
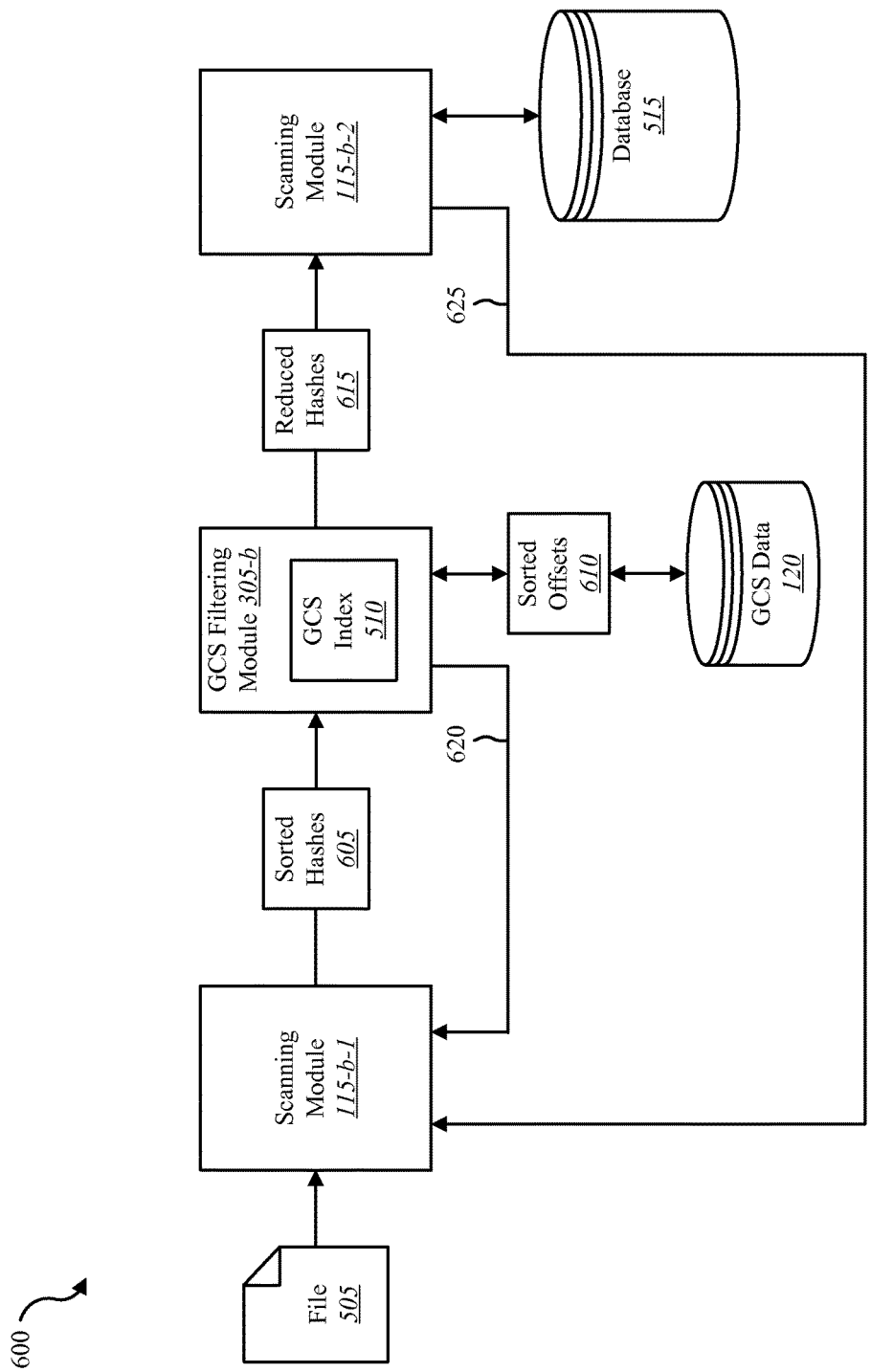
FIG. 6 is a block diagram illustrating another embodiment of an environment in which the present systems and methods may be implemented.

FIG. 6 is a block diagram illustrating another embodiment of an environment 600 in which the present systems and methods may be implemented. The depicted environment 600 may be one example of a server 210 depicted in FIG. 2. Alternatively, the environment 600 may be one example of a device 105 depicted in FIGS. 1, and/or 2.

In one embodiment, the environment 600 may be similar to the environment 500 depicted in FIG. 5. For example, environment 600 may include a file 505, scanning modules 115-b-1 and 115-b-2, a GCS filtering module 305-b, GCS data 120, database 515, and GCS filtering module 305-b may include GCS index 510. The scanning modules 115-b-1 and 115-b-2 may be examples of scanning module 115 depicted in FIGS. 1, 2, 3, and/or 5. The GCS filtering module 305-b may be one example of the GCS filtering module 305 depicted in FIGS. 3, 4, and/or 5.

In one embodiment, the environment 600 may perform one or more operations similar to those describe above with reference to environment 500 of FIG. 5. For example, scanning module 115-b-1 may select a file to scan (e.g., file 505). In some embodiments, scanning module 115-b-1 may compute multiple hashes for the data being scanned. For example, scanning module 115-b-1 may perform a scan of multiple items. As described above, server database may maintain a hash of up to billions of tokens. In one embodiment, scanning module 115-b-1 may sort and/or deduplicate the multiple computed hashes. Scanning module 115-b-1 may send the sorted (and/or deduplicated) hashes 605 to GCS filtering module 305-b. In some embodiments, GCS filtering module 305-b may query the GCS index 510 in relation to the sorted hashes 605. In one embodiment, without performing any further query, GCS filtering module 305-b may send at 620 a quick reply to the scanning module 115-b-1 based solely on the query of the GCS index 510. In some embodiments, based on the query of GCS index 510, GCS filtering module 305-b may determine whether GCS data 120 possibly contains a match for each of the sorted hashes 605. Upon determining GCS data 120 likely contains at least one match, GCS filtering module 305-b may send a quick reply to the scanning module 115-b-1 at 620.

In some embodiments, GCS filtering module 305-b may identify a location of the data within GCS data 120 that is indicated to match one or more of the sorted hashes 605. For each potential match found, in one embodiment, GCS filtering module 305-b may generate one or more sorted offsets 610 to enable a single read request of the on-disk GCS data 120. Based on the sorted offsets 610, GCS filtering module 305-b may retrieve the data at each of the indicated locations in a single disk read request (e.g., a single sweep of the magnetic head in a hard disk drive to retrieve the data for each of the matching hashes). Based on the data retrieved, GCS filtering module 305-b may analyze the retrieved data to determine whether to perform further data querying. In some embodiments, based on the analysis of the retrieved data, GCS filtering module 305-b may send at 620 a quick reply to scanning module 115-b-1.

In some embodiments, upon determining to perform further data querying, GCS filtering module 305-b may send reduced hashes 615 to scanning module 115-b-2. For example, as described above, from a group of two or more hashes, GCS filtering module 305-b may find a match for one or more of them. The remaining unmatched hashes (and/or any determined to be false positives) may be regarded as a reduced set of hashes (e.g., reduced hashes 615) marked for further data querying. In one embodiment, scanning module 115-b-2 may query database 515 to determine whether data in database 515 matches the at least one of the reduced hashes 615. Upon determining one or more matches exists between the reduced hashes 615 and data in the database 515, at 625 scanning module 115-b-2 may send a reply to the scanning module 115-b-1 indicating the one or more matches. In some embodiments, scanning module 115-b-2 may analyze data from database 515. Upon identifying one or more matches, at 625 scanning module 115-b-2 may send a reply to the scanning module 115-b-1 indicating the matches. Upon determining no match exists between at least one of the reduced set of hashes 615 and data in the database 515, at 625 scanning module 115-b-2 may send a reply to the scanning module 115-b-1 indicating no match exists for those hashes.

Figure 7:
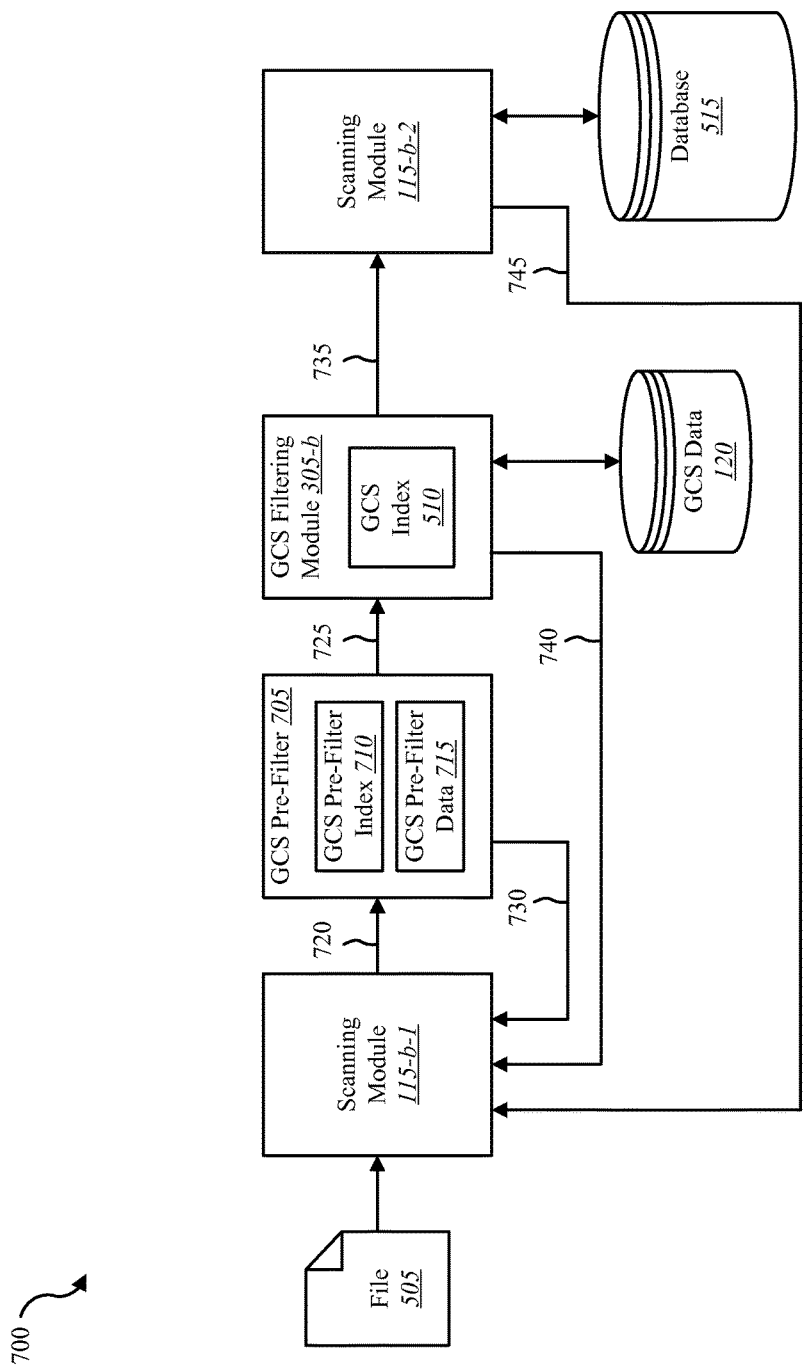
FIG. 7 is a block diagram illustrating another embodiment of an environment in which the present systems and methods may be implemented.

FIG. 7 is a block diagram illustrating another embodiment of an environment 700 in which the present systems and methods may be implemented. The depicted environment 700 may be one example of a server 210 depicted in FIG. 2. Alternatively, the environment 700 may be one example of a device 105 depicted in FIGS. 1, and/or 2.

In one embodiment, the environment 700 may be similar to the environments 500 and/or 600 depicted in FIGS. 5 and 6, respectively. For example, environment 700 as depicted may include a file 505, scanning modules 115-b-1 and 115-b-2, a GCS filtering module 305-b, GCS data 120, and database 515. The environment 700 may also include a GCS pre-filter 705. The GCS pre-filter 705 may include a GCS pre-filter index 710 and GCS pre-data 715. The depicted scanning modules 115-b-1 and 115-b-2 may be examples of scanning module 115 depicted in FIGS. 1, 2, 3, 5, and/or 6. The GCS filtering module 305-b may be one example of the GCS filtering module 305 depicted in FIGS. 3, 4, 5, and/or 6. The GCS filtering module 305-b may include a GCS index 510.

In one embodiment, the environment 700 may perform one or more operations similar to those describe above with reference to environment 500 of FIG. 5 and/or environment 600 of FIG. 6. For example, scanning module 115-b-1 may select a file to scan (e.g., file 505). In some embodiments, scanning module 115-b-1 may compute a hash for the data being scanned, and at 720 may send the hash to the GCS pre-filter 705. In some embodiments, scanning module 115-b-1 may send the data and/or file being scanned directly to GCS pre-filter 705. In some embodiments, GCS pre-filter 705 may be stored in system memory (e.g., random-access memory). Thus, both the GCS pre-filter index 710 and GCS pre-data 715 may be stored in the same random-access memory. Alternatively, the GCS pre-filter index 710 and GCS pre-data 715 may be stored in separate random-access memory modules.

In some embodiments, GCS pre-filter 705 may query the GCS pre-filter index 710 in relation to the data GCS pre-filter 705 receives from scanning module 115-b-1 at 720. In one example, without performing any further query regarding the data received at 720, GCS pre-filter 705 may send at 730 a quick reply (i.e., a response based solely on a query of a GCS pre-filter index, with no further data querying performed for the data being scanned) to the scanning module 115-b-1 based solely on the query of the GCS pre-filter index 710. In some embodiments, GCS pre-filter 705 may determine whether the in-memory GCS pre-filter data 715 possibly contains a match for the data received at 720. Upon determining GCS pre-filter data 715 likely contains a match, GCS pre-filter 705 may send a quick reply to the scanning module 115-b-1 at 730. In some embodiments, GCS pre-filter 705 may identify a location of the data within GCS pre-filter data 715 that is indicated to match at least a portion of the data received at 720. GCS pre-filter 705, in one embodiment, may retrieve the data at the indicated location. GCS pre-filter 705 may analyze the retrieved data to determine whether to perform further data querying. Based on the analysis of the retrieved data, GCS pre-filter 705 may send at 730 a quick reply to the scanning module 115-b-1 based on the analysis of the data of GCS pre-filter data 715.

In some embodiments, at 725 GCS pre-filter 705 may send at least a portion of the data received at 720 to GCS filtering module 305-b. For example, upon finding no match in the GCS pre-filter index 710 and/or GCS pre-filter data 715 for at least a portion of the data received at 720, at 725 GCS pre-filter 705 may send the non-matching portion to GCS filtering module 305-b. In some embodiments, GCS filtering module 305-b may query the GCS index 510 in relation to the data received at 725. In one example, without performing any further query regarding the data received at 725, GCS filtering module 305-b may send at 740 a quick reply to the scanning module 115-b-1 based solely on the query of the GCS index 510. In some embodiments, GCS filtering module 305-b may determine whether GCS data 120 possibly contains a match for the data received at 725. Upon determining GCS data 120 likely contains the match, GCS filtering module 305-b may send a quick reply to the scanning module 115-b-1 at 740. In some embodiments, GCS filtering module 305-b may identify a location of the data within GCS data 120 that is indicated to match the data received at 725. GCS filtering module 305-b, in one embodiment, may retrieve the data at the indicated location in a single disk read request (e.g., single sweep of the magnetic head in a hard disk drive). GCS filtering module 305-b may analyze the retrieved data to determine whether to perform further data querying. Based on the analysis of the retrieved data, GCS filtering module 305-b may send at 740 a quick reply to the scanning module 115-b-1 based on the analysis of the data of GCS data 120.

In some embodiments, upon determining to perform further data querying, at 735 GCS filtering module 305-b may send at least a portion of the data received at 725 to scanning module 115-b-2. For example, upon determining GCS data 120 does not contain a match for at least a portion of the data received at 725, GCS filtering module 305-b may send data to scanning module 115-b-2. In one embodiment, scanning module 115-b-2 may query database 515 to determine whether data in database 515 matches the data received at 735. Upon determining a match exists between the data received at 735 and data in the database 515, at 745 scanning module 115-*b*-2 may send a reply to the scanning module 115-*b*-1 indicating the match. Upon determining no match exists between the data received at 735 and data in the database 515, at 745 scanning module 115-*b*-2 may send a reply to the scanning module 115-*b*-1 indicating no match exists.

Figure 8:
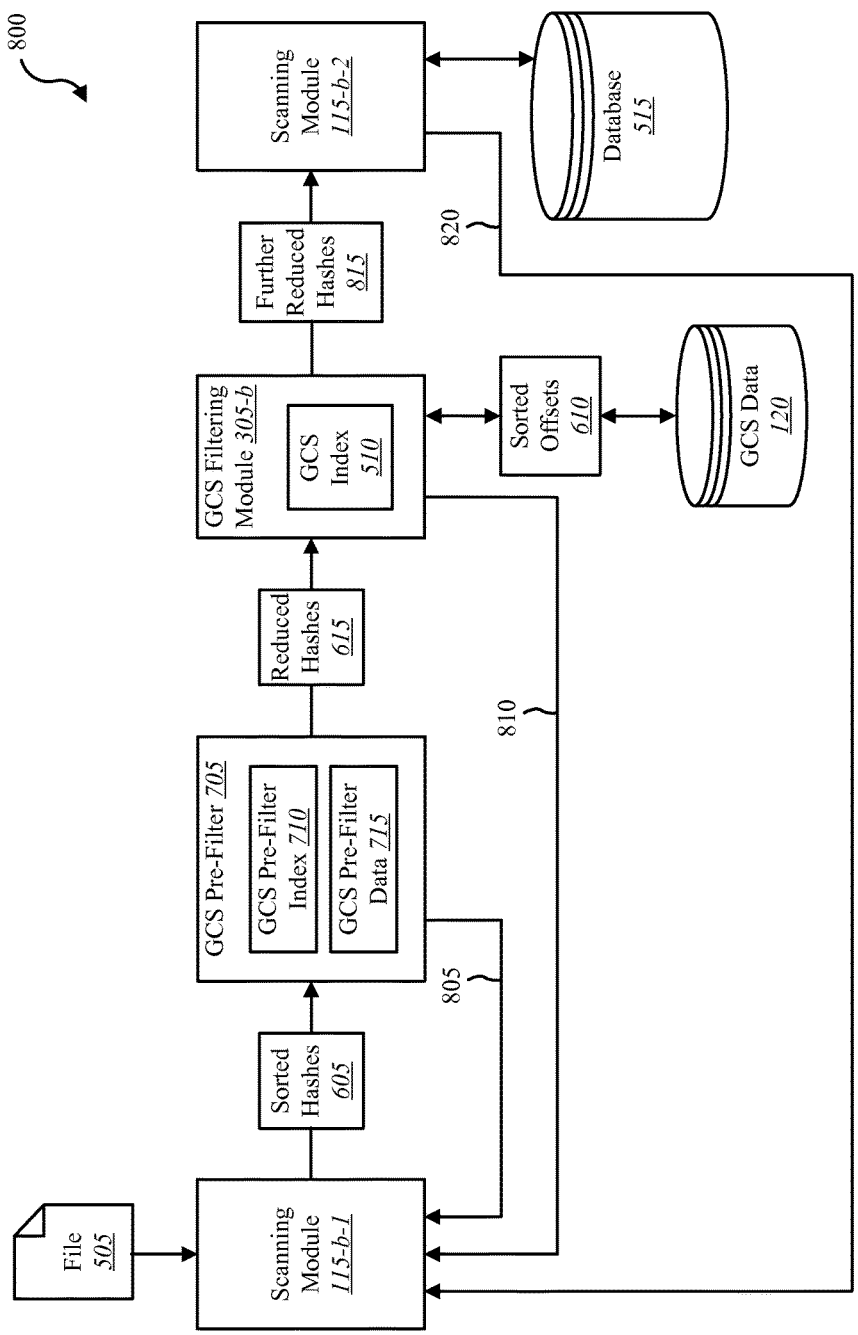
FIG. 8 is a block diagram illustrating another embodiment of an environment in which the present systems and methods may be implemented.

FIG. 8 is a block diagram illustrating another embodiment of an environment 800 in which the present systems and methods may be implemented. The depicted environment 800 may be one example of a server 210 depicted in FIG. 2. Alternatively, the environment 800 may be one example of a device 105 depicted in FIGS. 1, and/or 2.

In one embodiment, the environment 800 may be similar to the environments 500, 600, and/or 700 depicted in FIGS. 5, 6, and 7, respectively. For example, environment 800 may include a file 505, scanning modules 115-*b*-1 and 115-*b*-2, a GCS filtering module 305-*b*, GCS data 120, database 515, and GCS filtering module 305-*b* may include GCS index 510. Additionally, environment 800 may include a GCS pre-filter 705, which may include GCS pre-filter index 710 and GCS pre-filter data 715. The scanning modules 115-*b*-1 and 115-*b*-2 may be examples of scanning module 115 depicted in FIGS. 1, 2, 3, and/or 5. The GCS filtering module 305-*b* may be one example of the GCS filtering module 305 depicted in FIGS. 3, 4, and/or 5.

In one embodiment, the environment 800 may perform one or more operations similar to those describe above with reference to environments 500, 600, and/or 700 of FIGS. 5, 6, and 7, respectively. For example, scanning module 115-*b*-1 may select a file to scan (e.g., file 505). In some embodiments, scanning module 115-*b*-1 may compute multiple hashes for the data being scanned. In one embodiment, scanning module 115-*b*-1 may sort and/or deduplicate the multiple computed hashes. In some embodiments, scanning module 115-*b*-1 may send the computed hashes to the GCS pre-filter 705. In some embodiments, scanning module 115-*b*-1 may send the data and/or file being scanned directly to GCS pre-filter 705. In some embodiments, GCS pre-filter 705 may query the GCS pre-filter index 710 in relation to the sorted hashes 605 GCS pre-filter 705 receives from scanning module 115-*b*-1. In one example, without performing any further query regarding the sorted hashes 605 received, at 805 GCS pre-filter 705 may send a quick reply to the scanning module 115-*b*-1 based solely on the query of the GCS pre-filter index 710.

In some embodiments, GCS pre-filter 705 may determine whether the in-memory GCS pre-filter data 715 possibly contains one or more matches for the sorted hashes 605 received from scanning module 115-*b*-1. Upon determining GCS pre-filter data 715 likely contains one or more matches, GCS pre-filter 705 may send a quick reply to the scanning module 115-*b*-1 at 805. In some embodiments, GCS pre-filter 705 may identify one or more locations of data within GCS pre-filter data 715 that is indicated to match one or more of the sorted hashes 605. For example, if streaming module 115-*b*-1 were to send ten sorted hashes, the query of GCS pre-filter index 710 may indicate that any number of the ten sorted hashes match data in GCS pre-filter data 715. Alternatively, the query of GCS pre-filter index 710 may indicate that no match exists for any of the ten sorted hashes. Upon indicating a match exists, GCS pre-filter 705, in one embodiment, may retrieve the data at the indicated location. GCS pre-filter 705 may analyze the retrieved data to determine whether to perform further data querying. Based on the analysis of the retrieved data, GCS pre-filter 705 may send at 805 a quick reply to the scanning module 115-*b*-1 based on the analysis of the sorted hashes 605.

In some embodiments, each non-matching hash from the sorted hashes 605 may be sent to the GCS filtering module 305-*b*. GCS pre-filter 705 may send at least a portion of the sorted hashes 605 received at 720 to GCS filtering module 305-*b* (e.g., reduced hashes 615). For example, if the GCS pre-filter 705 determines that GCS pre-filter index 710 and/or GCS pre-filter data 715 do not contain a match for one or more of the sorted hashes 605, GCS pre-filter data 715 may send a reduced set, or pre-filtered set of hashes to GCS filtering module 305-*b*.

In some embodiments, GCS filtering module 305-*b* may query the GCS index 510 in relation to the reduced hashes 615 received from the GCS pre-filter 705. In one embodiment, without performing any further query, GCS filtering module 305-*b* may send at 810 a quick reply to the scanning module 115-*b*-1 based solely on the query of the GCS index 510. In some embodiments, based on the query of GCS index 510, GCS filtering module 305-*b* may determine whether GCS data 120 possibly contains a match for one or more of the reduced hashes 605. Upon determining GCS data 120 likely contains at least one match, GCS filtering module 305-*b* may send a quick reply to the scanning module 115-*b*-1 at 810.

In some embodiments, GCS filtering module 305-*b* may identify a location of the data within GCS data 120 that is indicated to match one or more of the reduced hashes 615. For each potential match found, in one embodiment, GCS filtering module 305-*b* may generate one or more sorted offsets 610 to enable a single read request of the on-disk GCS data 120. Based on the sorted offsets 610, GCS filtering module 305-*b* may retrieve the data at each of the indicated locations in a single disk read request (e.g., a single sweep of the magnetic head in a hard disk drive to retrieve the data for each of the matching hashes). Based on the data retrieved, GCS filtering module 305-*b* may analyze the retrieved data to determine whether to perform further data querying. In some embodiments, based on the analysis of the retrieved data, GCS filtering module 305-*b* may send at 810 a quick reply to scanning module 115-*b*-1.

In some embodiments, upon determining to perform further data querying, GCS filtering module 305-*b* may send further reduced set of hashes (e.g., reduced hashes 815) to scanning module 115-*b*-2. For example, as described above, from a group of ten hashes, GCS pre-filter 705 may identify a match for three of them, leaving a remainder of seven unmatched hashes (e.g., reduced hashes 615). GCS filtering module 305-*b* may find a match for five of the seven unmatched hashes, leaving a remainder of two unmatched hashes (e.g., further reduced hashes 815). Thus, the remaining two unmatched hashes may be a further reduced set of hashes similar to further reduced hashes 815.

In one embodiment, scanning module 115-*b*-2 may query database 515 to determine whether data in database 515 matches at least one of the further reduced hashes 815. Upon determining one or more matches exists between the further reduced hashes 815 and data in the database 515, at 820 scanning module 115-*b*-2 may send a reply to the scanning module 115-*b*-1 indicating the one or more matches. Upon determining no match exists between at least one of the further reduced set of hashes 815 and data in the database 515, at 820 scanning module 115-*b*-2 may send a reply to the scanning module 115-*b*-1 indicating no match exists for those hashes.

Figure 9:
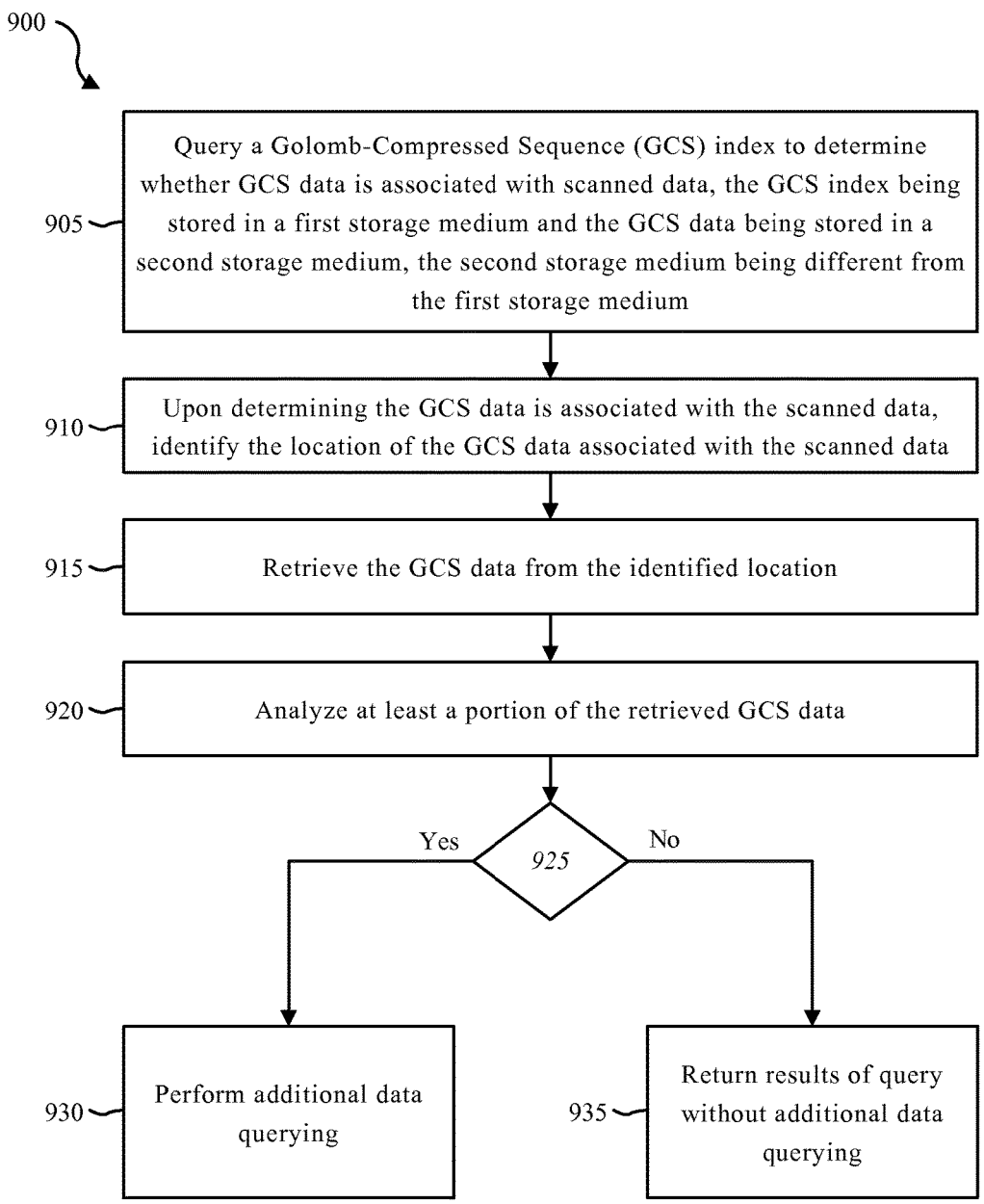
FIG. 9 is a flow diagram illustrating one embodiment of a method for scanning data.

FIG. 9 is a flow diagram illustrating one embodiment of a method 900 for scanning data. In some configurations, the method 900 may be implemented by the scanning module 115 illustrated in FIGS. 1, 2, 3, 5, 6, 7, and/or 8. In some configurations, the method 900 may be implemented by the application 215 illustrated in FIG. 2.

At block 905, a Golomb-Compressed Sequence (GCS) index may be queried to determine whether GCS data is associated with the scanned data. The GCS index may be stored in a first storage medium and the GCS data may be stored in a second storage medium, the second storage medium being different from the first storage medium. At block 910, upon determining the GCS data may be associated with the scanned data, the location of the GCS data associated with the scanned data may be identified. At block 915, the GCS data from the identified location may be retrieved. At block 920, at least a portion of the retrieved GCS data may be analyzed. At block 925, based on the analysis of the retrieved GCS data, it may be determined whether to perform additional data querying. At block 930, additional data querying is performed based on the determination to perform additional queries. At block 935, upon determining to perform no additional queries, results of the query may be returned (e.g., data for which no match was indicated in the GCS index, and/or data for which a match was indicated by the GCS index, but afterwards was verified to be not a match in the GCS data structure).

Figure 10:
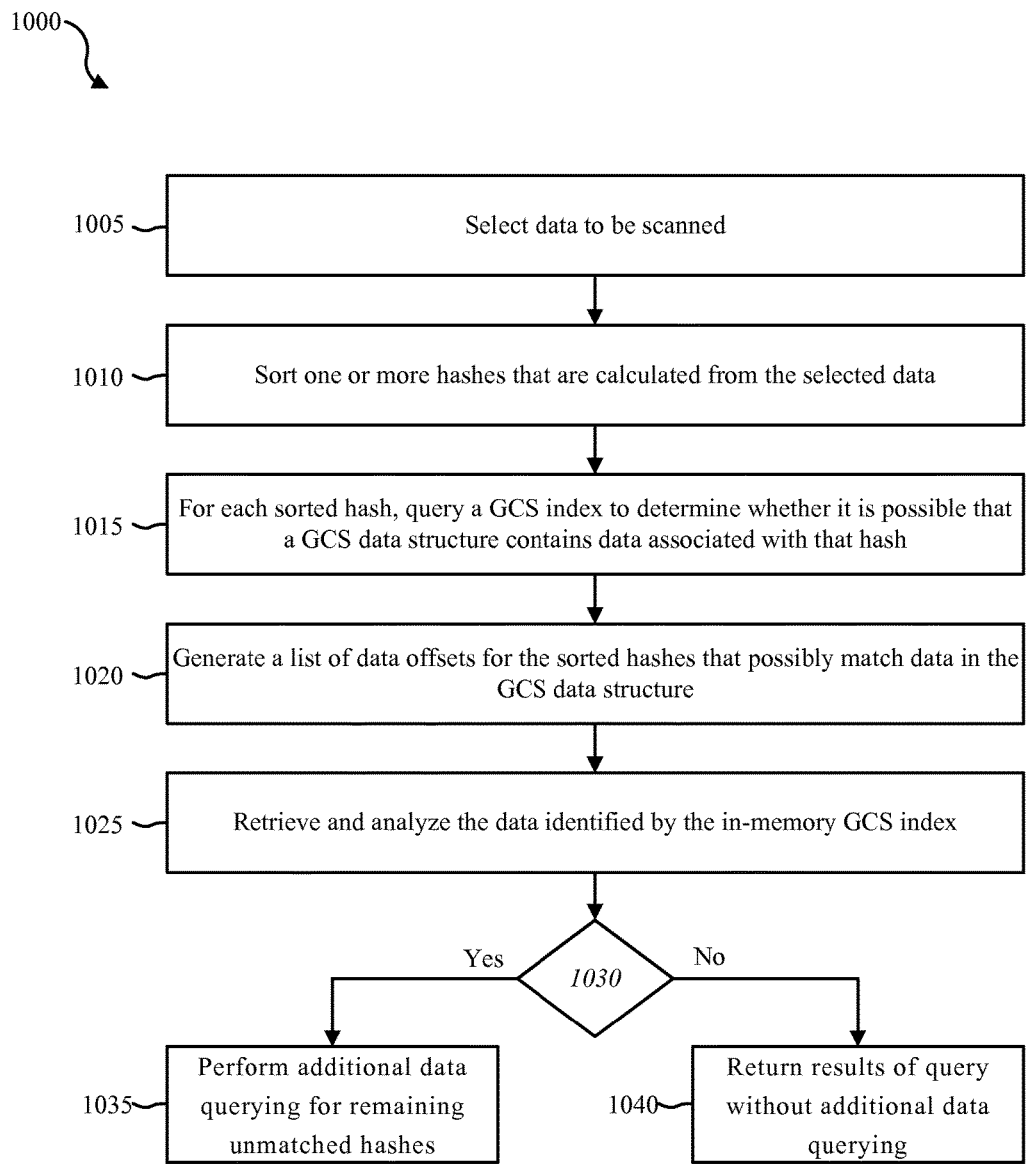
FIG. 10 is a flow diagram illustrating one embodiment of a method for querying a pre-filter in relation to scanning data.

FIG. 10 is a flow diagram illustrating one embodiment of a method 1000 for querying a pre-filter in relation to scanning data. In some configurations, the method 1000 may be implemented by the scanning module 115 illustrated in FIGS. 1, 2, 3, 5, 6, 7, and/or 8. In some configurations, the method 1000 may be implemented by the application 215 illustrated in FIG. 2.

At block 1005, data may be selected for scanning. At block 1010, one or more hashes that are calculated from the selected data may be sorted. Additionally, or alternatively, the one or more hashes may be deduplicated. At block 1015, for each sorted hash, a GCS index may be queried to determine whether it is possible that a GCS data structure contains data associated with that hash.

At block 1020, a list of data offsets may be generated for each of the sorted hashes that possible match data in the GCS data structure. At block 1025, the matching data from the GCS data structure may be retrieved. At block 1030, based on the analysis of the retrieved GCS data, it may be determined whether to perform additional data querying. In one embodiment, matching data for one of the hashes may be verified as a match, whereas matching data for another hash may be verified as not matching (i.e., a false positive). In the case of the data verified not to match, additional data querying may be performed. At block 1035, additional data querying may be performed for remaining unmatched hashes (e.g., hashes for which a match was indicated by the GCS index, and hashes verified to match data in the GCS data structure based on the analysis of the GCS data). At block 1040, results of query may be returned without additional data querying (e.g., hashes for which no match was indicated in the GCS index, and/or hashes for which a match was indicated by the GCS index, but afterwards was verified to be not a match in the GCS data structure).

Figure 11:
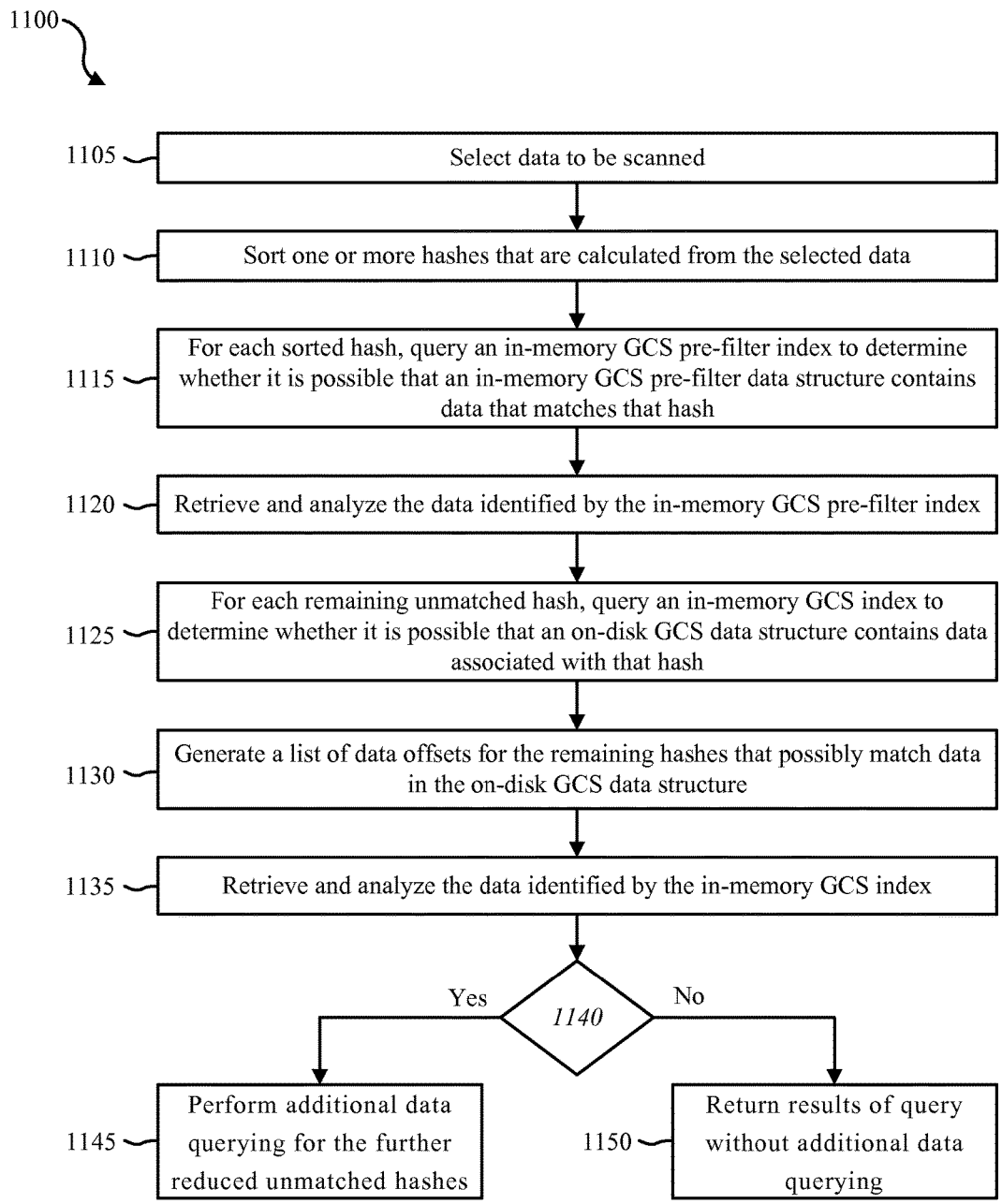
FIG. 11 is a flow diagram illustrating one embodiment of a method for scanning multiple hashes in relation to scanning data.

FIG. 11 is a flow diagram illustrating one embodiment of a method 1100 for scanning multiple hashes in relation to scanning data. In some configurations, the method 1100 may be implemented by the scanning module 115 illustrated in FIGS. 1, 2, 3, 5, 6, 7, and/or 8. In some configurations, the method 1100 may be implemented by the application 215 illustrated in FIG. 2.

At block 1105, data may be selected for scanning. At block 1110, one or more hashes that are calculated from the selected data may be sorted. Additionally, or alternatively, the one or more hashes may be deduplicated. At block 1115, for each sorted hash, an in-memory GCS pre-filter index may be queried to determine whether it is possible that an in-memory GCS pre-filter data structure contains data that matches that hash. In some embodiments, the results of the GCS pre-filter index query may be returned without further querying. At block 1120, the data identified by the in-memory GCS pre-filter index may be retrieved and analyzed.

At block 1125, for each remaining unmatched hash, an in-memory GCS index may be queried to determine whether it is possible that an on-disk GCS data structure contains data associated with that hash. At block 1130, a list of data offsets may be generated for each of the sorted hashes that possibly match data in the on-disk GCS data structure. At block 1135, the matching data from the GCS data structure identified by the in-memory GCS index may be retrieved and analyzed. At block 1140, based on the analysis of the retrieved GCS data, it may be determined whether to perform additional data querying. At block 1145, additional data querying may be performed for remaining unmatched hashes (e.g., hashes for which a match was indicated by the GCS index, and hashes verified to match data in the GCS data structure based on the analysis of the GCS data). At block 1150, results of query may be returned without additional data querying (e.g., hashes for which no match was indicated in the GCS index, and/or hashes for which a match was indicated by the GCS index, but afterwards was verified to be not a match in the GCS data structure).

Figure 12:
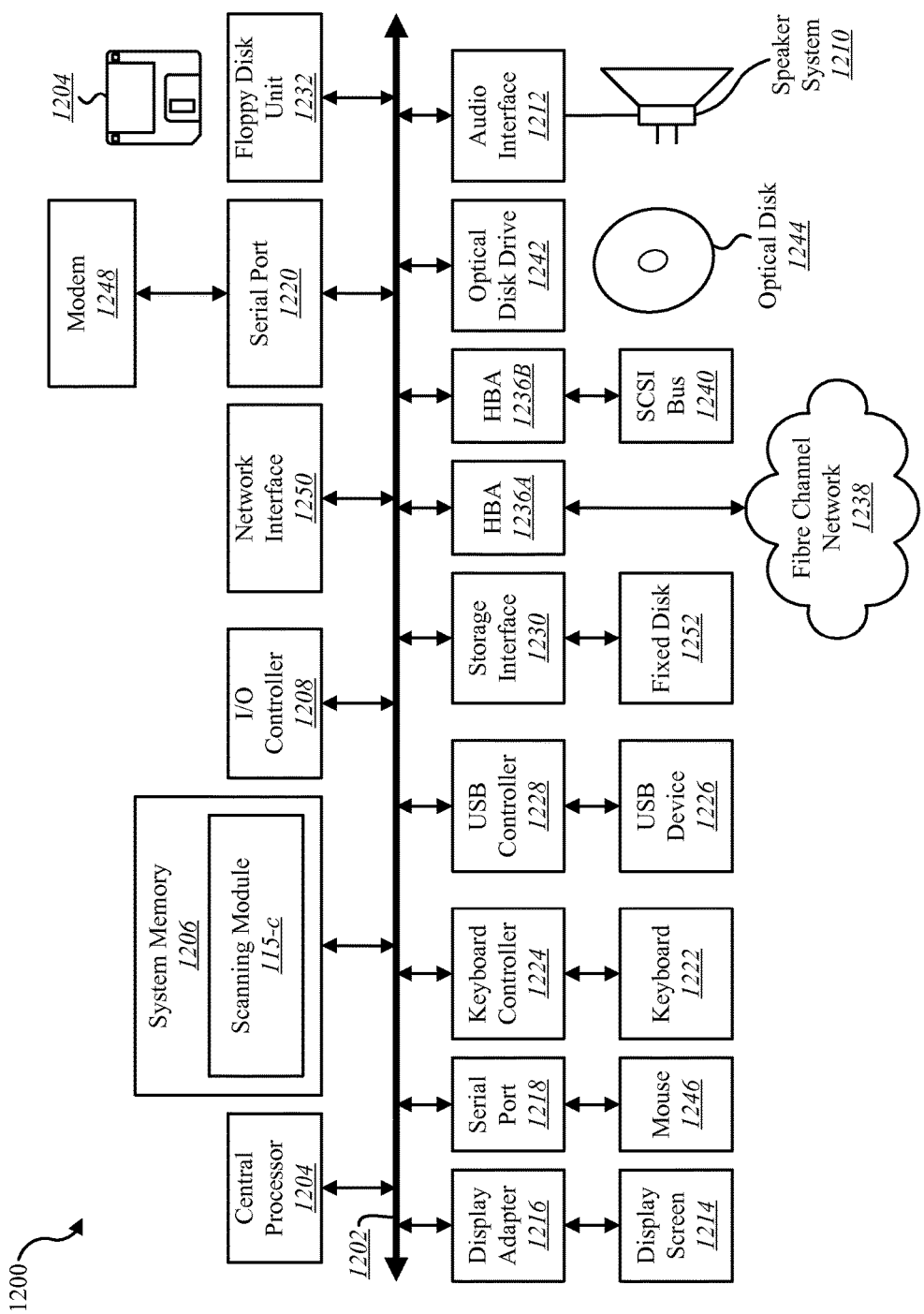
FIG. 12 depicts a block diagram of a computer system suitable for implementing the present systems and methods.

FIG. 12 depicts a block diagram of a computer system 1200 suitable for implementing the present systems and methods. The depicted computer system 1200 may be one example of a server 210 depicted in FIG. 2. Alternatively, the system 1200 may be one example of a device 105 depicted in FIGS. 1, and/or 2. Computer system 1200 includes a bus 1202 which interconnects major subsystems of computer system 1200, such as a central processor 1204, a system memory 1206 (typically RAM, but which may also include ROM, flash RAM, or the like), an input/output controller 1208, an external audio device, such as a speaker system 1210 via an audio output interface 1212, an external device, such as a display screen 1214 via display adapter 1216, serial ports 1218 and mouse 1246, a keyboard 1222 (interfaced with a keyboard controller 1224), multiple USB devices 1226 (interfaced with a USB controller 1228), a storage interface 1230, a host bus adapter (HBA) interface card 1236A operative to connect with a Fibre Channel network 1238, a host bus adapter (HBA) interface card 1236B operative to connect to a SCSI bus 1240, and an optical disk drive 1242 operative to receive an optical disk 1244. Also included are a mouse 1246 (or other point-and-click device, coupled to bus 1202 via serial port 1218), a modem 1248 (coupled to bus 1202 via serial port 1220), and a network interface 1250 (coupled directly to bus 1202).

Bus 1202 allows data communication between central processor 1204 and system memory 1206, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a scanning module 115-c to implement the present systems and methods may be stored within the system memory 1206. The scanning module 115-c may be one example of the scanning module 115 depicted in FIGS. 1, 2, 3, 5, 6, 7, and/or 8. Applications resident with computer system 1200 are generally stored on and accessed via a non-transitory computer readable medium, such as a rotational disk drive (e.g., fixed disk 1252), an optical drive (e.g., optical drive 1242), or other storage medium. Additionally, applications can be in the form of electronic signals modulated in accordance with the application and data communication technology when accessed via network modem 1248 or interface 1250.

Storage interface 1230, as with the other storage interfaces of computer system 1200, can connect to a standard computer readable medium for storage and/or retrieval of information, such as a fixed disk drive 1252. Fixed disk drive 1252 may be a part of computer system 1200 or may be separate and accessed through other interface systems. Modem 1248 may provide a direct connection to a remote server via a telephone link or to the Internet via an internet service provider (ISP). Network interface 1250 may provide a direct connection to a remote server via a direct network link to the Internet via a POP (point of presence). Network interface 1250 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present systems and methods. The devices and subsystems can be interconnected in different ways from that shown in FIG. 12. The operation of at least some of the computer system 1200 such as that shown in FIG. 12 is readily known in the art and is not discussed in detail in this application. Code to implement the present disclosure can be stored in a non-transitory computer-readable medium such as one or more of system memory 1206, fixed disk 1252, or optical disk 1244. The operating system provided on computer system 1200 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for scanning data, the method comprising:
    storing Golomb-Compressed Sequence (GCS) pre-filter data in a random-access memory;
    storing a GCS pre-filter index to the GCS pre-filter data in the random-access memory;
    storing GCS data on a non-transitory storage drive;
    storing a GCS index to the GCS data in the random-access memory;
    scanning at least a portion of data associated with a file to determine whether any portion of the scanned data matches contents of the GCS pre-filter data or GCS data;
    generating a plurality of hashes from the scanned data;
    sorting the plurality of hashes of the scanned data;

deduplicating the sorted plurality of hashes;
querying the pre-filter index with the plurality of sorted and deduplicated hashes to determine whether the GCS pre-filter data is associated with the scanned data;
upon determining the GCS pre-filter data is associated with the scanned data:
   identifying the location of the GCS pre-filter data associated with the scanned data;
   retrieving the GCS pre-filter data from the identified location;
   analyzing at least a portion of the retrieved GCS pre-filter data; and
   generating a notification indicating a match to the scanned data is found in the GCS pre-filter data;
upon determining at least one of the sorted and deduplicated hashes is not associated with the GCS pre-filter data, querying the GCS index with the at least one sorted and deduplicated hash not associated with the GCS pre-filter data to determine whether the GCS data is associated with the scanned data;
upon determining the GCS data is associated with the scanned data:
   identifying the location of the GCS data associated with the scanned data;
   retrieving the GCS data from the identified location;
   analyzing at least a portion of the retrieved GCS data;
   generating a notification indicating a match to the scanned data is found in the GCS data;
upon determining at least one of the sorted and deduplicated hashes is not associated with the GCS pre-filter data or the GCS data:
   querying a database with the at least one sorted and deduplicated hash not associated with the GCS pre-filter data or GCS data;
   determining whether data in the database is associated with the scanned data based on the querying; and
upon determining data in the database is associated with the scanned data:
   identifying the location of data in the database associated with the scanned data;
   retrieving the data in the database from the identified location;
   analyzing at least a portion of the retrieved data in the database;
   generating a notification indicating a match to the scanned data is found in the database.

2. The method of claim 1, further comprising:
identifying a location of GCS data for each of the plurality of sorted and deduplicated hashes that is associated with the scanned data;
generating a list of file offsets that enable a single hard disk drive read request based on the identified plurality of locations of GCS data.

3. The method of claim 2, further comprising:
retrieving the GCS data from the identified plurality of locations; and
analyzing at least a portion of the retrieved GCS data.

4. The method of claim 3, further comprising:
determining, based on the analysis of the GCS data associated with the plurality of sorted and deduplicated hashes, whether to perform additional data querying.

5. The method of claim 1, further comprising:
upon determining the GCS data is not associated with the scanned data, determining, based on the query of the GCS index, whether to perform additional data querying.

6. A computing device configured to scan data, comprising:
a hardware processor;
memory in electronic communication with the processor;
instructions stored in the memory, the instructions being executable by the processor to:
   store Golomb-Compressed Sequence (GCS) pre-filter data in a random-access memory;
   store a GCS pre-filter index to the GCS pre-filter data in the random-access memory;
   store GCS data on a non-transitory storage drive;
   store a GCS index to the GCS data in the random-access memory;
   scan at least a portion of data associated with a file to determine whether any portion of the scanned data matches contents of the GCS pre-filter data or GCS data;
   generate a plurality of hashes from the scanned data;
   sort the plurality of hashes of the scanned data;
   deduplicate the sorted plurality of hashes;
   query the pre-filter index with the plurality of sorted and deduplicated hashes to determine whether the GCS pre-filter data is associated with the scanned data;
   upon determining the GCS pre-filter data is associated with the scanned data, identify the location of the GCS pre-filter data associated with the scanned data:
      retrieve the GCS pre-filter data from the identified location;
      analyze at least a portion of the retrieved GCS pre-filter data; and
      generate a notification indicating a match to the scanned data is found in the GCS pre-filter data;
   upon determining at least one of the sorted and deduplicated hashes is not associated with the GCS pre-filter data, query the GCS index with the at least one sorted and deduplicated hash not associated with the GCS pre-filter data to determine whether the GCS data is associated with the scanned data;
   upon determining the GCS data is associated with the scanned data:
      identify the location of the GCS data associated with the scanned data;
      retrieve the GCS data from the identified location;
      analyze at least a portion of the retrieved GCS data;
      generate a notification indicating a match to the scanned data is found in the GCS data;
   upon determining at least one of the sorted and deduplicated hashes is not associated with the GCS pre-filter data or the GCS data:
      querying a database with the at least one sorted and deduplicated hash not associated with the GCS pre-filter data or GCS data;
      determining whether data in the database is associated with the scanned data based on the querying; and
   upon determining data in the database is associated with the scanned data:
      identify the location of data in the database associated with the scanned data;
      retrieve the data in the database from the identified location;
      analyze at least a portion of the retrieved data in the database;
      generate a notification indicating a match to the scanned data is found in the database.

7. The computing device of claim 6, wherein the instructions are executable by the processor to:
  identify a location of GCS data for each of the plurality of sorted and deduplicated hashes that is associated with the scanned data.

8. The computing device of claim 7, wherein the instructions are executable by the processor to:
  generate a list of file offsets that enable a single hard disk drive read request to acquire the GCS data from the identified plurality of locations of GCS data;
  retrieve the GCS data from the identified plurality of locations in a single sweep of a magnetic head of a hard disk drive;
  analyze at least a portion of the retrieved GCS data; and
  determine, based on the analysis of the GCS data associated with the plurality of sorted and deduplicated hashes, whether to perform additional data querying.

9. A computer-program product for scanning data, the computer-program product comprising a non-transitory computer-readable medium storing instructions thereon, the instructions being executable by a processor to:
  store Golomb-Compressed Sequence (GCS) pre-filter data in a random-access memory;
  store a GCS pre-filter index to the GCS pre-filter data in the random-access memory;
  store GCS data on a non-transitory storage drive;
  store a GCS index to the GCS data in the random-access memory;
  scan at least a portion of data associated with a file to determine whether any portion of the scanned data matches contents of the GCS pre-filter data or GCS data;
  generate a plurality of hashes from the scanned data;
  sort the plurality of hashes of the scanned data;
  deduplicate the sorted plurality of hashes;
  query the pre-filter index with the plurality of sorted and deduplicated hashes to determine whether the GCS pre-filter data is associated with the scanned data;
  upon determining the GCS pre-filter data is associated with the scanned data, identify the location of the GCS pre-filter data associated with the scanned data;
    retrieve the GCS pre-filter data from the identified location;
    analyze at least a portion of the retrieved GCS pre-filter data; and
    generate a notification indicating a match to the scanned data is found in the GCS pre-filter data;
  upon determining at least one of the sorted and deduplicated hashes is not associated with the GCS pre-filter data, query the GCS index with the at least one sorted and deduplicated hash not associated with the GCS pre-filter data to determine whether the GCS data is associated with the scanned data;
  upon determining the GCS data is associated with the scanned data:
    identify the location of the GCS data associated with the scanned data;
    retrieve the GCS data from the identified location;
    analyze at least a portion of the retrieved GCS data;
    generate a notification indicating a match to the scanned data is found in the GCS data;
  upon determining at least one of the sorted and deduplicated hashes is not associated with the GCS pre-filter data or the GCS data:
    querying a database with the at least one sorted and deduplicated hash not associated with the GCS pre-filter data or GCS data;
    determining whether data in the database is associated with the scanned data based on the querying; and
  upon determining data in the database is associated with the scanned data:
    identify the location of data in the database associated with the scanned data;
    retrieve the data in the database from the identified location;
    analyze at least a portion of the retrieved data in the database;
    generate a notification indicating a match to the scanned data is found in the database.

\* \* \* \* \*